No. 861,523. PATENTED JULY 30, 1907.
P. J. DE B. KOPS.
ROTARY ENGINE.
APPLICATION FILED SEPT. 24, 1906.
2 SHEETS—SHEET 1.
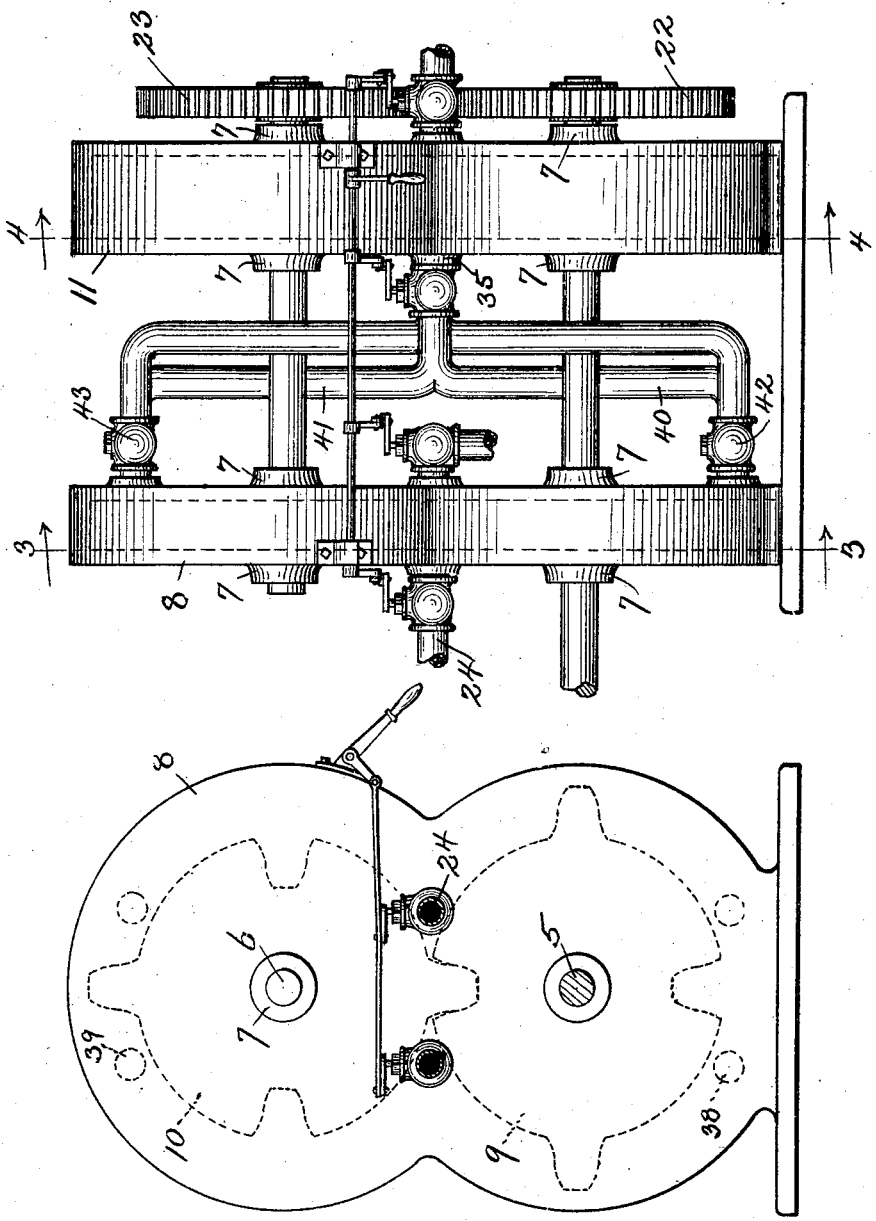
Witnesses
Agnes M. Dowling
Julia J. Bergeon
Inventor:
Paul J. deBruyn Kops
By R. J. Jaeker
Atty.

No. 861,523. PATENTED JULY 30, 1907.
P. J. DE B. KOPS.
ROTARY ENGINE.
APPLICATION FILED SEPT. 24, 1906.

2 SHEETS—SHEET 2.

Witnesses
Agnes M. Dowling
Julia J. Bergeon

Inventor:
Paul J. de Bruyn Kops
By R. J. Jacker
Atty.

UNITED STATES PATENT OFFICE.

PAUL J. DE BRUYN KOPS, OF WAKE, VIRGINIA.

ROTARY ENGINE.

No. 861,523.      Specification of Letters Patent.      Patented July 30, 1907.

Application filed September 24, 1906. Serial No. 336,045.

*To all whom it may concern:*

Be it known that I, PAUL J. DE BRUYN KOPS, a citizen of the United States, residing at Wake, in the county of Middlesex and State of Virginia, have invented a new and useful Rotary Engine, of which the following is a specification.

My invention relates to rotary engines in which there are two disks arranged in the same plane with their peripheral edges together and connected to rotate in unison, and the objects of my invention are first, to attain a large efficiency by compounding; second, to enable running the engine either forward or backward; third, to make a simple, cheap and durable construction and other objects to become apparent from the description to follow.

The engine is made by mounting rigidly on two parallel shafts two disks in the same plane having their peripheries contacting and provided with alternate meshing teeth and notches in just sufficient numbers to act as pistons or valves against which the steam acts. The preferred number of teeth and notches in each disk is two; that is each disk is provided on its periphery with two radially extending teeth, preferably diametrically opposite one another, and with two radial notches to accommodate the teeth on the other disk. To retain the disks in proper relationship with one another, a pair of intermeshing gears are mounted rigidly on the same shafts with the disks. The disks are inclosed in a snugly fitting casing while the gears are on the exterior of the casing. The relative position of the disks is such that when steam is admitted into the casing on one side of the contacting point of the disks each will be rotated in an opposite direction, and when steam is admitted into the casing on the other side of the contacting point of the disks each will be rotated in a reverse direction. The inlets and outlets for the steam are so arranged that the steam can expand and be used in another cylinder after the force of the live steam has been spent.

To describe my invention in detail so that others versed in the art to which is pertains may understand it sufficiently to make and use the same, I have illustrated it on the accompanying two sheets of drawings forming a part of this specification in which:—

Figure 4:
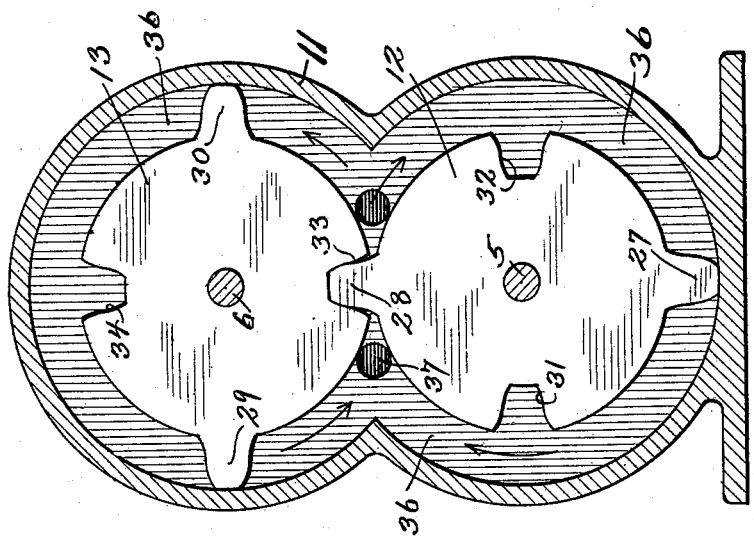
Figure 3:
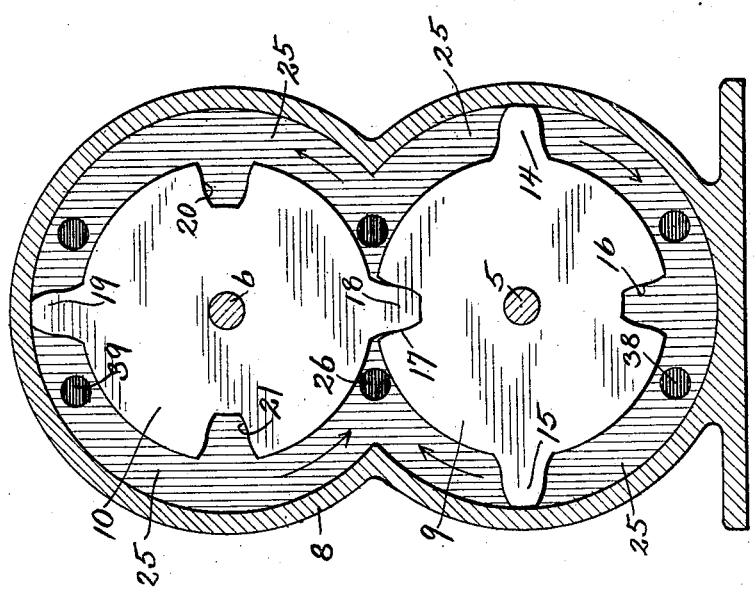

Figure 1, is an end view of an engine embodying my invention; Fig. 2, is a side elevation of the same; Fig. 3, is a section on line 3—3 of Fig. 2; and Fig. 4, is a section on line 4—4 of Fig. 2.

Similar reference characters refer to similar parts throughout the several views.

The shafts 5 and 6 are parallel and are mounted to rotate in the bearings 7. Within the housing 8 are the disks 9 and 10 and within the housing 11 are the disks 12 and 13; said disks being rigidly secured to the shafts 5 and 6. The construction, arrangement and manner of operation of the disks, 9 and 10, and 12 and 13, are identical except as to the size and I shall therefore in the description to follow refer to only one pair of disks. The disk 9 is provided on its periphery with the tooth-like extensions 14 and 15 and with the depressions 16 and 17, while the disk 10 is provided on its periphery with the toothlike extensions 18 and 19 and the depressions 20 and 21. The shafts 5 and 6 are connected by the spur gears 22 and 23 which are always in mesh. The extensions and depressions on the disks 9 and 10 are so arranged that as the disks rotate in the direction indicated by the arrows in Fig. 3, the extension 18 will enter the depression 17, the extension 15 will enter the depression 21, the extension 19 will enter the depression 16, and the extension 14 will enter the depression 20 consecutively, the same cycle of movements being repeated as long as the disks are rotated. The extensions 14, 15, 18 and 19 each fit snugly into their coöperating depressions and also fit close to the inner face of the housing 8 so that when steam under pressure is admitted at 24, into the space 25 between the inner walls of the casing 8 and the periphery of the disks 9 and 10, the extensions will act as pistons and be forced about the shafts 5 and 6 as fulcrums and of course the disks and shafts will be rotated. An exhaust opening for the steam is provided at 26 so that the steam will pass in at 24, around the spaces 25 carrying the extensions 14, 15, 18 and 19 around with it and pass out into the atmosphere through the exhaust opening 26. The disks 12 and 13 in the housing 11 operate the same way, being provided with the extensions 27, 28, 29 and 30, the depressions 31, 32, 33 and 34, the steam inlet 35, the passages 36 and the exhaust opening 37.

Steam under high pressure from a boiler or any other source is admitted at 24 and as will be seen from an examination of Fig. 3, will be locked between the extensions 14 and 15 just as soon as the former passes the inlet 24, and likewise will be locked between extensions 18 and 19 as soon as extension 18 passes the inlet 24. The steam thus locked in is dead and cannot exert any useful power unless some provision is made for its escape and for this reason, I provide in the housing 8 adjacent to each disk 9 and 10 diametrically opposite the inlet 24 the openings 38 and 39 communicating with the passages 25. The pipes 40 and 41 serve to conduct the steam from the openings 38 and 39 to the inlet 35 in the housing 11. Check valves 42 and 43 are provided in the pipes 40 and 41 to prevent the steam from either opening 38 or 39 from passing back through the other and out of the exhaust 26.

To enable the reverse movement of the parts duplicate inlets and outlets are provided in the housings 8 and 11. The several pipes leading to and from the different openings are provided with valves which are preferably connected by levers, so that only one lever need be moved to reverse the engine.

In operation the steam under high pressure enters at 24, forces both disks 9 and 10 around in the manner described and exhausts at 26. During its travel through the passages 25 the steam under pressure expands and passes out through openings 38 and 39, pipes 40 and 41 and inlet 35; thence around in the passages 36 and finally exhausts at 37.

Having thus fully described my invention what I claim as new and desire to secure by Letters Patent of the United States is:—

1. In a rotary engine, the combination of a suitable housing provided with two internal circular intersecting cavities, a disk provided with two radial extensions and two radial depressions on its periphery mounted concentrically in each of said cavities, two inlet ports through said housing near the junction of said cavities, two exhaust ports through said housing near the junction of said cavities, two exhaust ports through said housing communicating with each of said cavities at points diametrically opposite to said first named exhaust ports and valves to control said inlet and outlet ports.

2. In a rotary engine, the combination of a suitable housing provided with two internal circular intersecting cavities, a disk provided with two radial extensions and two radial depressions on its periphery rotatably mounted in each of said cavities, two inlet ports through said housing near the junction of said cavities controlled by independent shut-off valves, two exhaust ports through said housing near the junction of said cavities controlled by independent shut-off valves, two exhaust ports through said housing communicating with each of said cavities at points diametrically opposite said first named exhaust ports and a lever connected to all four of said shut-off valves whereby the direction of rotation of said disks is controlled.

3. In a rotary engine, the combination of two suitable housings each provided with two internal circular intersecting cavities, a disk provided with two radial extensions and two radial depressions on its periphery mounted concentrically in each of said cavities, two inlet ports, provided with independent shut-off valves through each of said housings near the junction of said cavities, two exhaust ports, provided with independent shut-off valves through each of said housings near the junction of said cavities, two exhaust ports controlled by check valves through each of said housings near the junction of said cavities, two exhaust ports controlled by check valves through each of said housings communicating diametrically opposite to said first named exhaust ports and a lever connected to operate all of said shut-off valves, in unison.

In testimony whereof I have signed my name to this specification in presence of two subscribing witnesses this 18th day of September, 1906 at West Hope, N. D.

PAUL J. DE BRUYN KOPS.

Witnesses:
A. P. ANDERSON,
W. J. COOPER.